(12) United States Patent
Roy et al.

(10) Patent No.: US 9,189,290 B2
(45) Date of Patent: Nov. 17, 2015

(54) DISTRIBUTING PROCESSING OF ARRAY BLOCK TASKS

(71) Applicant: Hewlett-Packard Development Company, L.P., Houston, TX (US)

(72) Inventors: Indrajit Roy, Mountain View, CA (US); Erik Tamas Bodzsar, Chicago, IA (US); Robert Schreiber, Palo Alto, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 352 days.

(21) Appl. No.: 13/799,176

(22) Filed: Mar. 13, 2013

(65) Prior Publication Data

US 2014/0282594 A1 Sep. 18, 2014

(51) Int. Cl.
*G06F 9/46* (2006.01)
*G06F 9/50* (2006.01)

(52) U.S. Cl.
CPC .................................... *G06F 9/5066* (2013.01)

(58) Field of Classification Search
None
See application file for complete search history.

(56) References Cited

U.S. PATENT DOCUMENTS

| 8,418,181 | B1* | 4/2013 | Sirota et al. | 718/102 |
| 2008/0104601 | A1* | 5/2008 | Kaneko et al. | 718/103 |
| 2009/0172679 | A1* | 7/2009 | Yoshida et al. | 718/102 |
| 2011/0047555 | A1* | 2/2011 | Lakshmanan et al. | 718/105 |
| 2013/0132967 | A1* | 5/2013 | Soundararajan et al. | 718/104 |
| 2014/0032595 | A1* | 1/2014 | Makkar et al. | 707/770 |

OTHER PUBLICATIONS

Buck, SciHadoop: Array-based Query Processing in Hadoop, ACM 2011, 11 pages.*
Erik Bodzsar, "Out-of-Core Computation Support in R," Power Point Presentation, 30 pages.
Shiraram Venkataraman et al., "Presto: Distributed Machine Learning and Graph Processing with Sparse Matrices," 12 pages.

* cited by examiner

*Primary Examiner* — Diem Cao
(74) *Attorney, Agent, or Firm* — Trop, Pruner & Hu, P.C.

(57) ABSTRACT

A technique includes distributing a plurality of tasks among a plurality of worker nodes to perform a processing operation on an array. Each task is associated with a set of a least one data block of the array, and an order of the tasks is defined by an array-based programming language. Distribution of the tasks includes, for at least one of the worker nodes, selectively reordering the order defined by the array-based programming language to regulate an amount of data transferred to the worker node.

17 Claims, 4 Drawing Sheets

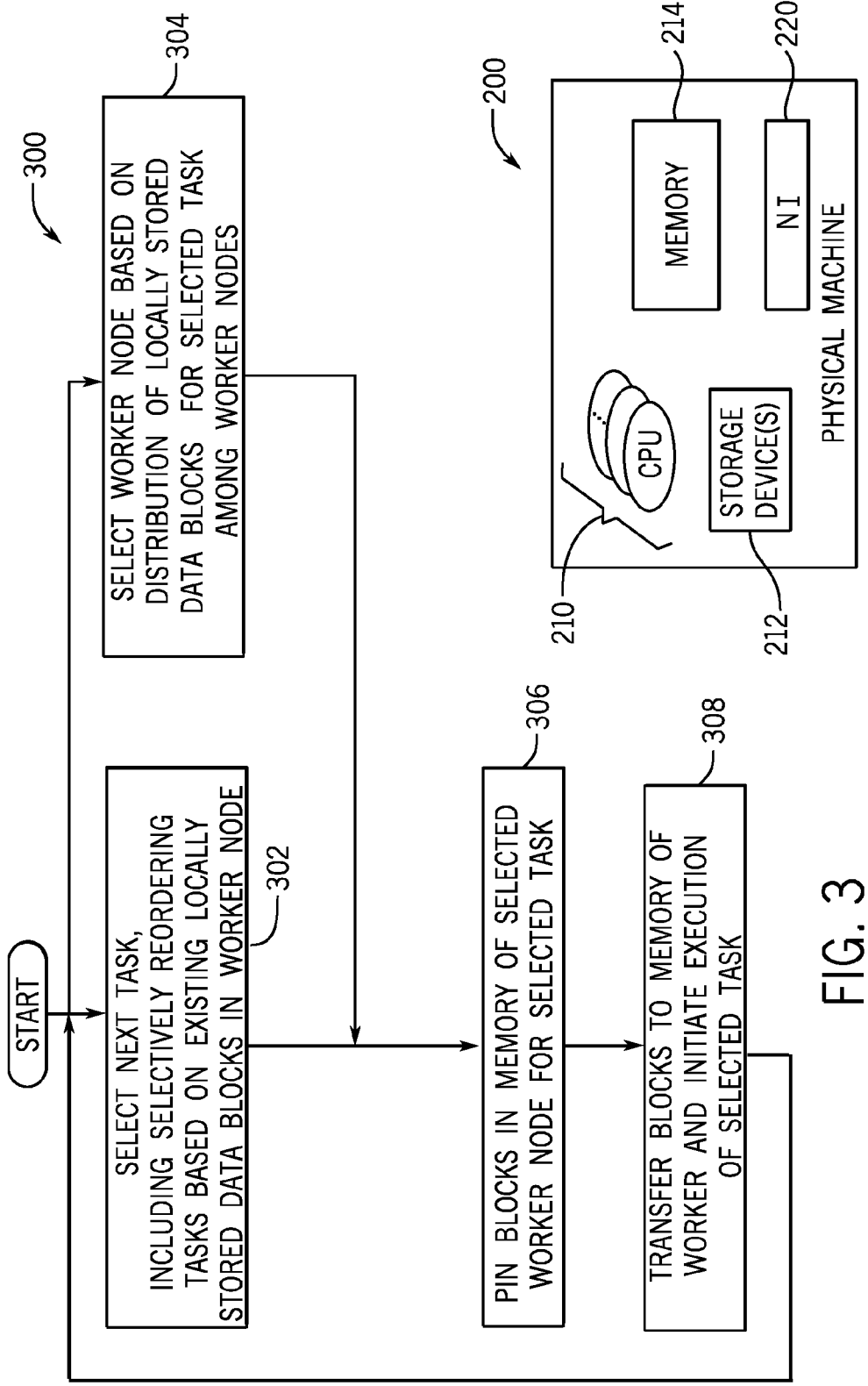

DISTRIBUTING PROCESSING OF ARRAY BLOCK TASKS

BACKGROUND

Many real world analytics applications process massive datasets. For example, machine learning may be applied to a social media-based dataset that may correspond to tens of thousands of users (or more) for purposes of mining the dataset for patterns, such as patterns that identify particular individual profiles; identify the more important, or "connected," individuals represented by the dataset; and so forth. As another example, a relatively large dataset of acquired metric information from computer networks may be mined to learn and identify certain patterns associated with server failures for such purposes as predicting when a given server is about to fail or identifying maintenance issues for servers.

BRIEF DESCRIPTION OF THE DRAWINGS

FIG. 2 is a schematic diagram of a physical machine according to an example implementation.

FIG. 3 is a flow diagram depicting a technique to distribute tasks among worker nodes for performing array block computations according to an example implementation.

DETAILED DESCRIPTION

A large data array, such as an array that is associated with a matrix, may exceed the physical memory space of a typical computer. Therefore, the persistent storage space of server(s), in addition to main memory, may be used to perform matrix operations on such data arrays. Systems and techniques are disclosed herein that distribute compute tasks for a given matrix operation among multiple parallel worker nodes and can leverage their storage space.

Figure 1:
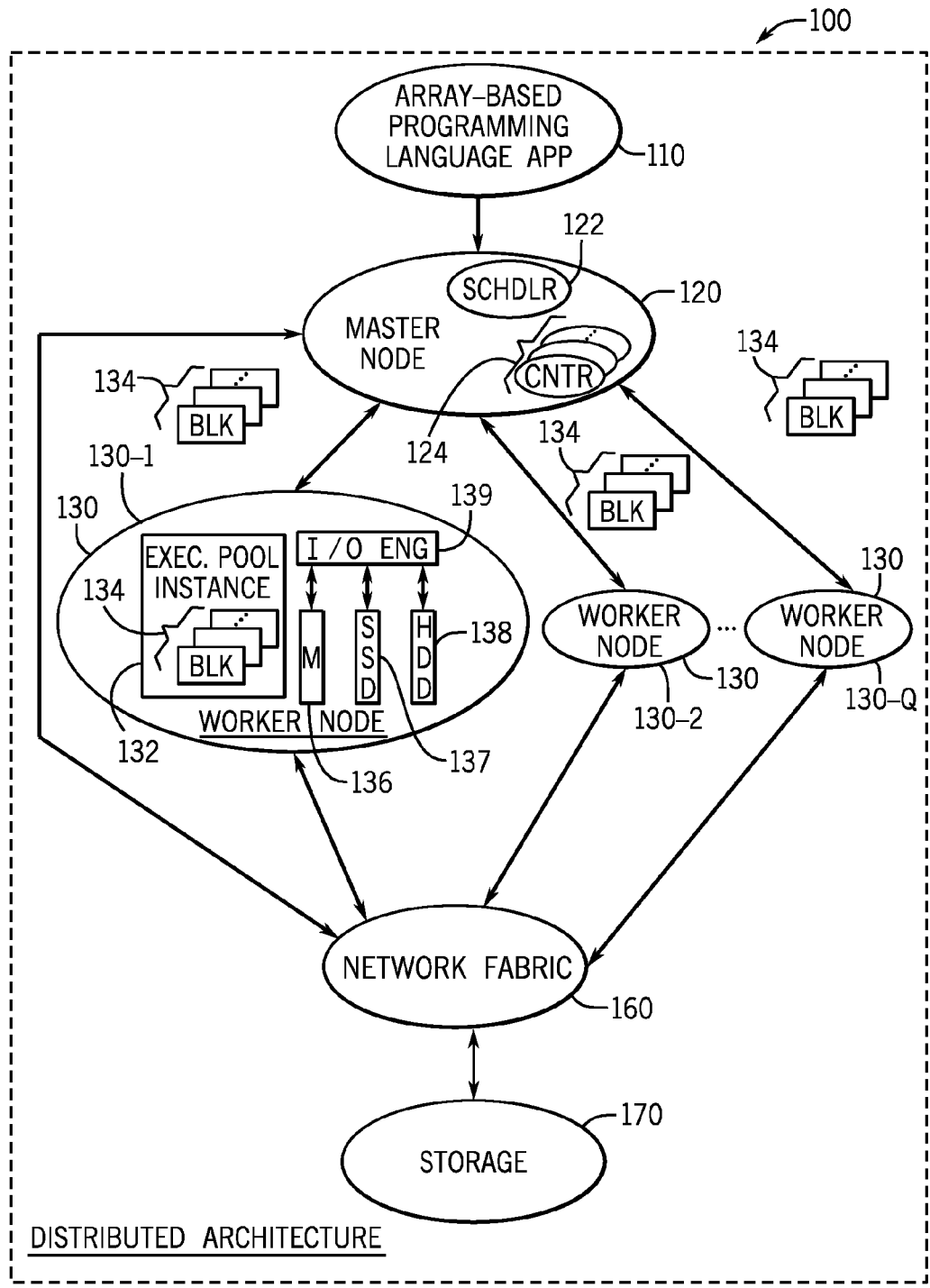
FIG. 1 is a schematic diagram of a distributed architecture for performing array block computations according to an example implementation.

Referring to FIG. 1, a distributed architecture 100 for processing a matrix operation for a large data array, in accordance with an example implementation, includes a master node 120 and Q worker nodes 130 (worker nodes 130-1, 130-2 . . . 130-Q, being depicted as examples in FIG. 1). The master node 120 includes a scheduler 122 that assigns compute tasks for partitioned blocks of the array among the worker nodes 130 in a manner that overlaps computations with input/output communications and minimizes the amount of I/O communication used to transfer blocks of data to worker nodes 130 assigned to perform the compute tasks on these blocks. In this manner, as disclosed herein, the scheduler 122 performs such functions as assigning tasks to the workers 130; determining an order in which the tasks are executed; reserving memory space for the blocks of data in the worker nodes 130 (in a process called "pinning"); initiating I/O transfers of blocks of data into the local memories of the worker nodes 130; and unpinning the blocks of data from the worker node's local memories when the task(s) using the blocks have completed.

In accordance with an example implementation, the blocks of data and the associated tasks are derived from an array-based programming language application 110. As an example, the application 110 may be an R-based array-oriented statistical programming language that is constructed to subdivide arrays into blocks of data and indicate operations to be performed on the array so that the scheduler 122 may distribute tasks to perform the operations among the worker nodes 130. More specifically, in accordance with some example implementations, the array-based application 110 may be an R-based programming language that is combined with a Presto-based programming environment language developed by Hewlett-Packard Co. to provide language extensions and a run time to manage distributed execution.

As a more specific example, R may use the following syntax for an array. R may use interpreted conditional execution (if), loops (for, while, repeat), and use procedures written in C, C++ and FORTRAN for better performance. Example code segment 1 below illustrates the R programming language:

EXAMPLE CODE SEGMENT 1

```
1: > A<-array(10:18,dim=c(3,3))      #3x3 matrix
2: > A
            [,1]   [,2]   [,3]
    [1,]    10     13     16
    [2,]    11     14     17
    [3,]    12     15     18
3: > A[1,]                            #First row
    [1]     10     13     16
4: > idx<-array(1:3,dim=c(3,2))       #Index vector
5: > idx
            [,1]   [,2]
    [1,]    1      1
    [2,]    2      2
    [3,]    3      3
6: > A[idx]                           #Diagonal of A
    [1]     10     14     18
7: > A%*%idx                          #Matrix multiply
            [,1]   [,2]
    [1,]    84     84
    [2,]    90     90
    [3,]    96     96
```

Line 1 in the above example creates a 3×3 matrix. The argument "dim" in line 1 specifies the shape of the matrix (i.e., 3 rows by 3 columns), and the sequence "10:18" in line 1 is used to fill the matrix (i.e., fill elements [1,1] to [3,3] with the sequence 10 to 18. Entire subarrays may be referenced by omitting specific index values along a dimension. For example, in line 3, the first row of the matrix is obtained by A[1;], where the column is left blank to fetch the entire first row. Subsections of a matrix may be extracted using index vectors. An index vector is an ordered vector of rows, where each row can be the index to another array. To extract the diagonal of A, an index vector idx is created in line 4 whose elements are (1;1), (2;2) and (3;3). In line 6, A[idx] returns the diagonal elements of A. In a single machine environment, R has native support for matrix multiplication, linear equation solvers, matrix decomposition and others. For example, %*% is an R operator for matrix multiplication (see line 7).

With the Presto environment, the R language may be extended with language extensions and a runtime to manage the distributed execution. In addition to scalability, these extensions add parallel execution and incremental processing. Programmers may use these extensions to write the array-based application 110, which is submitted to the master node 120.

Presto introduces distributed arrays in R. Distributed arrays (created through a darray construct) provide a shared, in-memory view of multidimensional data stored across multiple machines. Distributed arrays have the following characteristics. Distributed arrays may be partitioned into the data blocks, which may be chunks of rows, columns or blocks. Users may either specify the size of the partitions or let the runtime determine it. Locally, sparse partitions may be stored in a compressed sparse column format. Partitions help programmers specify coarse-grained parallelism by assigning tasks to operate on partitions. Partitions can be referred to by the splits function. More specifically, the main programming language constructs of Presto are shown in Table 1 below:

TABLE 1

| Functionality | Description |
| --- | --- |
| darray (dim=, blocks=, sparse=) | Create a distributed array with dimensions specified by dim, and partitioned by blocks of size blocks |
| splits (A, i) | Return $i^{th}$ partition of the distributed array A or the whole array if i is not specified |
| foreach (v, A, F( )) | Execute function f as distributed tasks for each element v of A. Implicit barrier at the end of the loop. |
| update (A) | Publish the changes to A. |
| repartition (A, n=, merge=) | Repartition A into n parts |
| invariant (A, B, type=) | Declare compatibility between arrays A and B by rows or columns or both. Used by the runtime to maintain invariants while repartitioning |

Distributed arrays may be read-shared by multiple concurrent tasks. The runtime can leverage user hints to cache and co-locate data. Such hints reduce the overhead of remote copying during computation. Concurrent writes to array partitions may not be supported in the system to simplify how programs are written.

Distributed arrays may be directly constructed from data in the storage layer. The Presto storage driver supports parallel loading of array partitions. If the array registered a callback on the storage table then whenever the data is changed the array will be notified and updated by the driver. Distributed arrays may also be created, re-sized and updated in the form of intermediate data during a computation. Thus, distributed arrays are dynamic, as both the contents and the size of the distributed arrays may change as data is incrementally updated.

Referring to FIG. 1, the application 110 may therefore subdivide, or partition, a given array into blocks 134; and these blocks 134 may be distributed in a transparent fashion among one or more of the worker nodes 130, along with associated tasks to be performed on the blocks. These parallel tasks may be expressed using "for each" loops, where each iteration of a "for each" loop is some task to be executed on one or more of the blocks 134. The master node 120, in response to the blocks and tasks provided by the array-based programming language application 110, selects the worker nodes 130 for the specific tasks, determines the order of the tasks (not necessarily in the order defined by the application 110, as further described below), reserves the blocks for the assigned tasks in the worker nodes 130 and initiates the execution of the tasks. For any blocks not presently in their local memories, the worker nodes 130 load the reserved blocks 134 into their local memories and/or transfer the blocks 134 into their local memories from other worker nodes 130; and then the worker nodes 130 execute the assigned tasks.

As depicted in FIG. 1, each worker node 130 may have one or multiple execution pool instances 132; and for each instance 132, the worker node 130 performs a compute tasks on one or multiple blocks 134 that are associated with the task. The worker node 130 includes an I/O engine 139 for purposes of communicating blocks 132 to and from the local system memory 136 of the worker node 130 as well as for purposes of performing I/O transfers (via network fabric 160) to remote storage 170 and other worker nodes 130. As depicted in FIG. 1, in accordance with some implementations, the worker node 130 may include local, non-volatile memory storage, such as solid state storage 137 and hard disk drive storage 138.

Referring to FIG. 2 in conjunction with FIG. 1, in accordance with example implementations, the master node 120 and worker nodes 130 may each be a physical machine, such as an example physical machine 200 that is depicted in FIG. 2. In this regard, the physical machine 200 is an actual machine that is made up of actual hardware and actual machine executable instructions, or "software," or "programs." In this manner, as depicted in FIG. 2, the physical machine 200 may include one or more processors, such as one or more central processing units (CPUs) 210, and/or processing cores. The physical machine 200 may further include, for example, memory 214, a network interface 220, storage device(s) 212 (hard disk storage devices and/or solid state storage devices, as examples) and various other hardware. Moreover, the physical machine 200 may store various program instructions in the memory 214, such as, for the master node 120, machine executable instructions corresponding to the scheduler 122 and the application 110. For the worker node 130, the memory 214 corresponds to local system memory 136 (see FIG. 1), which stores blocks 134 that are processed along with machine executable instructions corresponding to the specific task or tasks being performed on the blocks 134.

Referring to FIG. 3 in conjunction with FIG. 1, in accordance with an example implementation, the scheduler 122 performs a technique 300. Pursuant to the technique 300, the scheduler 122 selects the next task (block 302) and selects the worker node 130 to perform the selected task (block 304). More specifically, the scheduler 122 selects (block 302) the next task, including selectively reordering tasks, based on existing locally stored data on the worker nodes and to regulate an amount of data transferred to the worker node 130. In this regard, in accordance with some implementations, the scheduler 122 selectively reorders the tasks to decrease the I/O communication. For example, if an iterative algorithm executes a single task on each of n blocks in every iteration and only k blocks (where k is less than n) fit into the local memory 136 at once, then the scheduler 122 saves k blocks of I/O in every iteration, as compared to another schedule, which executes, for example, the n tasks in order. Due to the reordering by the scheduler 122, the scheduler 122 performs the first k tasks of the current iteration on the k blocks, which are already present in the memory from the previous iteration.

The scheduler 122 selects a worker node 130 for a given task based on the existing distribution of the data blocks for that task among the worker nodes 130. In this manner, in accordance with example implementations, the scheduler 122 identifies (block 304) the worker node 130 having the largest size of locally stored data for the selected task and assigns the task to that worker node 130.

After the task and worker node 130 for the task are selected, the scheduler 122 "pins" (block 306) the associated blocks for the selected task in the memory of the selected worker node 130. In this context, "pinning a block" means making a reservation for the block in the workers local memory 136.

More specifically, after a worker node 130 has been selected for a task, the scheduler 122 waits until all of the blocks for the task are reserved, or pinned, in the memory of that worker node 130 before initiating transfers (if any) by the worker node 130 to transfer any blocks missing from the worker node 130 into the memory 136 of the worker node 130. If there is not enough free space in the local memory 136 of the selected worker node 130, the scheduler 122 flushes unpinned blocks to storage from the worker node's local memory 136. If there are multiple tasks whose input blocks can be pinned in the worker node's local memory, the task having the most input bytes currently in local memory 136 takes precedence in the scheduling order, in accordance with an example implementation.

Thus, when the input blocks for a given task are pinned in a given worker node's memory, the scheduler 122 instructs the worker node 130 to fetch any blocks 134 that are currently not in the worker's local memory. The I/O engine 139 of the worker node 130 then retrieves any missing blocks, which may involve transferring the data from the solid state drive 137 or hard disk drive 138 of the worker node 130; transferring the data from another storage node; transferring the data from another worker node 130; transferring the data from remote storage; and so forth. After the I/O engine 139 fetches the missing block(s) (if any), an execution instance 132 of the worker node 130 processes the blocks 134 for the task. When the task is completed, the scheduler 122 unpins the blocks 134 (i.e., removes the reservations for the blocks), in accordance with an example implementation, so that the unpinned blocks may be removed if, for example, their removal is needed to pin any other blocks 134.

Figure 4:
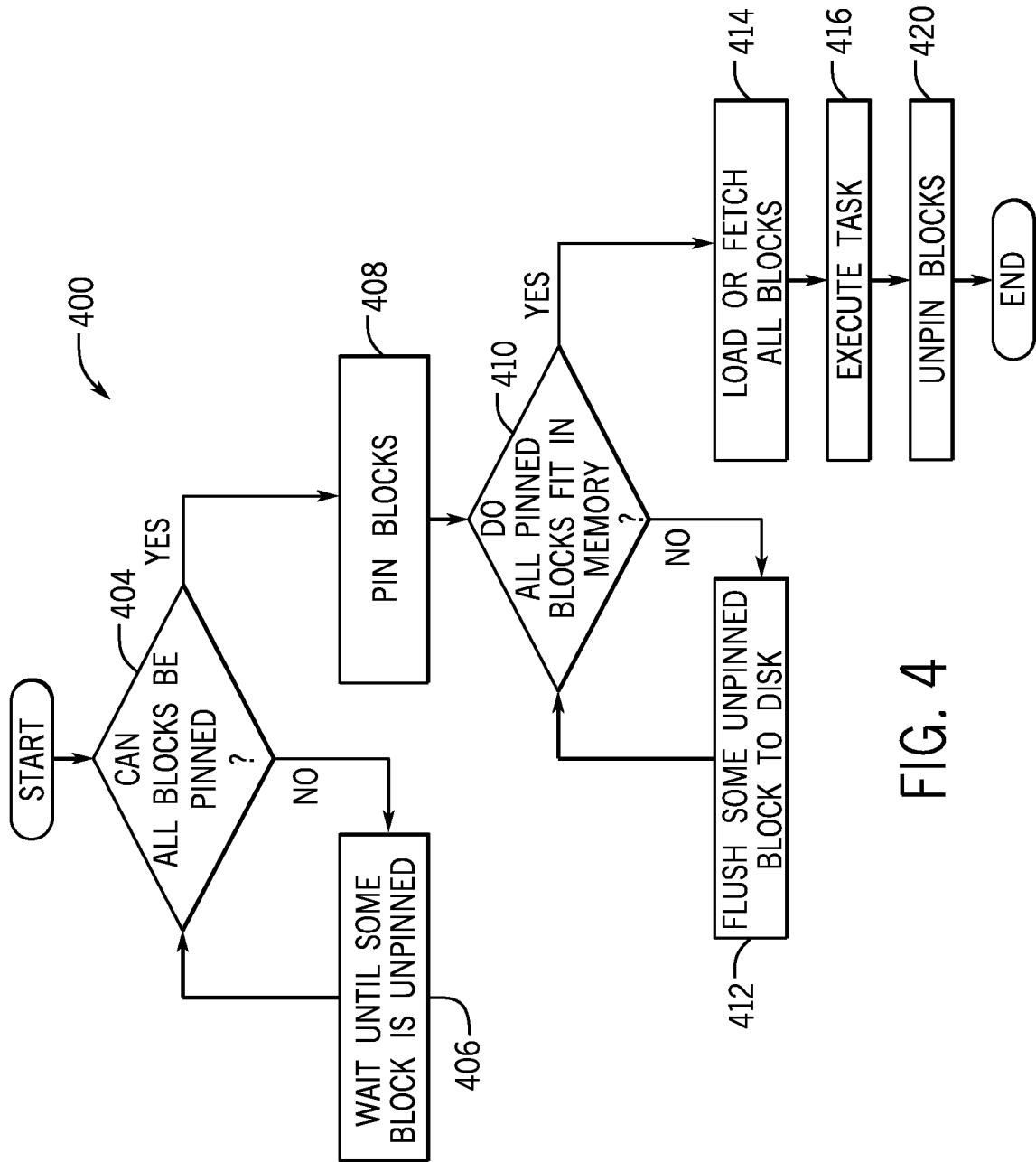
FIG. 4 is a flow diagram depicting a data block pinning technique according to an example implementation.

Thus, referring to FIG. 4, in accordance with example implementations, a technique 400 may be employed for purposes of pinning and unpinning blocks 134 in a worker node 130 for purposes of the worker node 130 performing an assigned compute task on the blocks 134. Pursuant to the technique 400, the scheduler 122 determines (decision block 404) whether all of the blocks 134 for the task may be pinned. If not, the scheduler 122 waits (block 406) until one or more blocks are unpinned to allow all of the blocks to be pinned. After the scheduler 122 pins (block 408) blocks, the scheduler 122 determines (decision block 410) whether all of the pinned blocks 134 can be stored in the local memory 136. If not, one or multiple unpinned blocks may be flushed to storage, pursuant to block 412 so that the pinned blocks for the tasks may be loaded into the local memory 136, pursuant to block 414. The task 416 may then be executed by the worker node 130, pursuant to block 416; and subsequently, the blocks 134 associated with the tasks may be unpinned, pursuant to block 420.

In accordance with example implementations, a block 134 may be pinned in the local memory 136 before it is actually physically present in the local memory 136. By pinning a block before it is physically present, the scheduler 122 ensures that enough free space remains available for blocks 134 that are in flight from other worker nodes 130. Because each block 134 may be used by multiple tasks executing on the same worker node 130, in accordance with some implementations, the scheduler 122 uses counters 124 (see FIG. 1) to track the pinning. In this manner, each counter 124 may be associated with the pinning of a block 134 for an associated task. In this manner, each pinning of a block 134 increments the counter 124 associated with the block 134, and each unpinning of the block 134 decrements the counter 124. A block is unpinned from the local memory 136 if the associated counter 124 is zero, i.e., if there are no currently running or scheduled tasks that use it.

The storage format may have an impact on the storage and communication overheads. For example, a given data block 134 may describe a sparse matrix (e.g., the adjacency matrix representation of graphs), which may not be compactly represented in the current format for the data block 134. As another example, if a matrix is divided by rows then storing each partition in column compressed format (CSC) for the data block 134 may be relatively inefficient, as compared to storing the data in a row compressed format or even in a standard triplet format. In such cases, the data movement time for the data block 134 may increase by four fold due to the CSC format.

Therefore, in accordance with example implementations, whenever the scheduler 122 informs a worker node 130 of I/O movement (either to disk or across the network) from the node 130 of one or more of its data blocks 134, the worker node 130 decides the storage format that is best suited for this I/O movement. For example, in accordance with example implementations, the worker node 130 compares the costs in terms of the estimated I/O costs in communicating the data block(s) 134 in different formats and the estimated costs of converting the data block(s) in their current format into one of the candidate formats. The worker node 130 then decides the storage format with the lowest cost, taking one or more of the cost components into consideration. As an example, the worker node 130 may minimize the following cost function for purposes of determining whether to convert a data block 134 having a first format into a different candidate format:

$$\text{Cost} = \text{format conversion time} + (\text{number of worker nodes communicating the data} * \text{data size/network bandwidth}), \quad \text{Eq. 1.}$$

Figure 5:
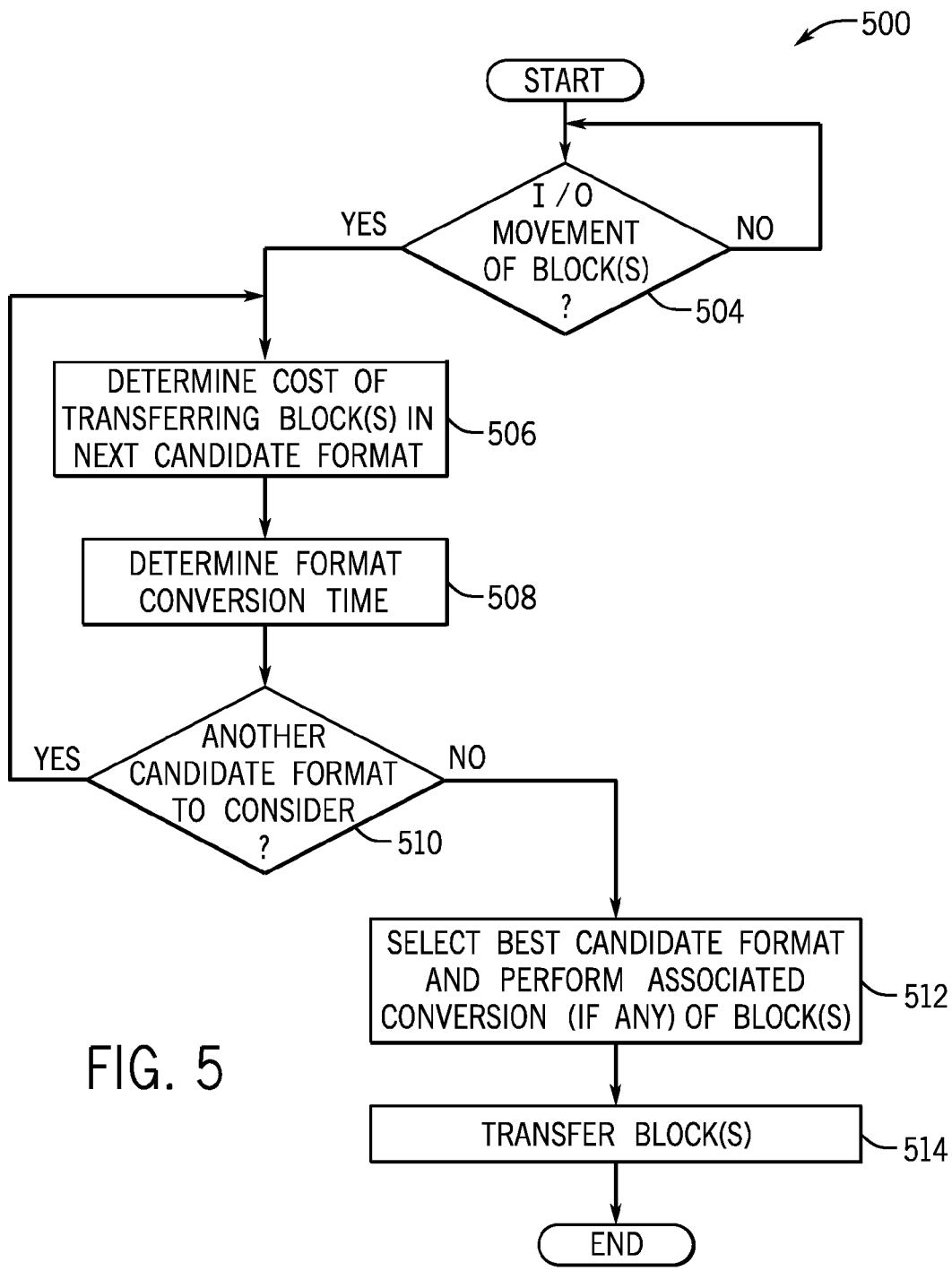
FIG. 5 is a flow diagram depicting a worker node-based technique to selectively reformat data block(s) to be communicated by the worker node according to an example implementation.

Thus, referring to FIG. 5, in accordance with an example implementation, the worker node 130 may perform a technique 500 for purposes of evaluating whether to convert the storage format of one or more blocks 134 that are transferred from the node 130. Pursuant to the technique 500, the worker node 130 determines (decision block 504) whether I/O movement of one or multiple blocks stored by the worker node 130 is pending. If so, the worker node 130 determines (block 506) the cost of communicating the block(s) in the next candidate format. For this candidate format, the worker node 130 estimates (block 508) an associated conversion time. This iterative process may be repeated each time that the worker node 130 determines (decision block 510) that another candidate format is to be considered.

After the associated communication costs and conversion times for the candidate formats have been determined, the worker node 130 selects (block 512) the candidate format having the lowest associated cost and performs the associated conversion (if any) of the block(s) and subsequently transfers (block 512) the formatted/unformatted blocks. It is noted that in some cases, as a result of the technique 500, the worker node 130 may not reformat the block(s) 134.

Among the potential advantages of the systems and techniques that are disclosed herein, out-of-core computations are enabled without the programmer having to worry about data movement between memory and disk. Time consumed waiting for I/O communications to complete are mitigated by overlapping I/O communications with computations, when possible. The amount of I/O communication is mitigated by preferentially executing tasks that have more input bytes available in memory. The data storage format may be dynamically optimized to decrease data movement overheads. Other and different advantages are contemplated, in accordance with further implementations, as can be appreciated by the skilled artisan.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
distributing a plurality of tasks among a plurality of worker nodes to perform a processing operation on an array, each task of the plurality of tasks being associated with a set of at least one data block of the array and an order of the tasks being defined by an array-based programming language, wherein distributing the plurality of tasks comprises: for at least one of the worker nodes, selectively reordering the order defined by the array-based programming language to regulate an amount of data transferred to the worker node;
selecting a given worker node of the plurality of worker nodes to perform a given task of the plurality of tasks;
communicating at least one block of data associated with the given task with the given worker node; and
using the given worker node to determine a format of the communicated at least one block of data, wherein using the given worker node comprises selecting a given candidate format based at least in part on a time estimated by the worker node to perform a format conversion into the given candidate format and a cost of communicating using the candidate format.

2. The method of claim 1, wherein distributing the plurality of tasks further comprises:
for at least one of the sets of at least one data block of the array, selecting the worker node for the associated task which has the most data stored locally on the worker node for the at least one set.

3. The method of claim 1, wherein a plurality of candidate tasks of the plurality of tasks may be performed by given worker node of the plurality of worker node, the method further comprising:
selecting the candidate task from the plurality of candidate tasks which has the most associated data stored locally on the given worker node.

4. The method of claim 3, wherein selecting the candidate task comprises selectively reordering the order defined by the array-based programming language to minimize a data transfer.

5. The method of claim 1, wherein at least one of the worker nodes is selected to perform a given task of the plurality of tasks, the method further comprising:
at least one of the selected worker nodes, reserving the at least one data block of the associated set in a memory of the worker node for fetching the data before processing starts.

6. The method of claim 5, further comprising:
determining whether the memory has the capacity to store all data for the associated set; and
based on the determination, selectively flushing at least one other block of a set not associated with the given task from the memory based at least in part on whether the flushed at least one other block has been reserved.

7. The method of claim 5, further comprising removing the reservation for the at least one data block after the at least one selected worker node performs the associated task.

8. An article comprising a non-transitory computer readable storage medium storing instructions that when executed by a computer cause the computer to:
distribute a plurality of tasks among a plurality of worker nodes to perform a processing operation on an array, each task of the plurality of tasks being associated with a set of at least one data block of the array and an order of the tasks being defined by an array-based programming language;
for at least one of the worker nodes, selectively reorder the order defined by the array-based programming language to regulate an amount of data transferred to the worker node;
select a given worker node of the plurality of worker nodes to perform a given task of the plurality of tasks;
communicate at least one block of data associated with the given task with the given worker node; and
use the given worker node to determine a format of the communicated at least one block of data by selecting a given candidate format based at least in part on a time estimated by the worker node to perform a format conversion into the given candidate format and a cost of communicating using the candidate format.

9. The article of claim 8, the storage medium storing instructions that when executed by the computer cause the computer to:
For at least one of the sets of at least one data block of the array, select the worker node from the plurality nodes for the associated task which has the most data stored locally on the worker node for the at least one set.

10. The article of claim 8, wherein a plurality of candidate tasks of the plurality of tasks may be performed by a given worker node of the plurality of worker nodes, the storage medium storing instructions that when executed by the computer cause the computer to select the candidate task from the plurality of candidate tasks which has the most associated data stored locally on the given worker node.

11. The article of claim 10, the storage medium storing instructions that when executed by the computer cause the computer to selectively reorder a task order defined by an array-based programming language.

12. The article of claim 8, wherein at least one of the worker nodes is selected to perform a given task of the plurality of tasks, the storage medium storing instructions that when executed by the computer cause the computer to:
for at least one of the selected worker nodes, reserve the at least one data block of the associated set in a memory of the worker for retrieving data before starting the task to process data.

13. A system comprising:
a master node comprising a processor to distribute a plurality of tasks among a plurality of worker nodes to perform a processing operation on an array, each task of the plurality of tasks being associated with a set of at least one data block of the array and an order of the tasks being defined by an array-based programming language;
a scheduler to, for at least one of the worker nodes, selectively reorder the order defined by the array-based programming language to regulate an amount of data transferred to the worker node; and
a given worker node of the plurality of worker nodes to:
perform a given task of the plurality of tasks;
receive at least one block of data associated with the given task with the given worker node; and
select a given candidate format based at least in part on a time estimated by the worker node to perform a format conversion into the given candidate format and a cost of communicating using the candidate format.

14. The system of claim 13, wherein the scheduler selects at least one of the worker nodes to perform a given task of the plurality of tasks, the scheduler being adapted to:

for at least one of the selected worker nodes, reserve the at least one data block of the associated set in a memory of the worker node regardless of whether the memory of the worker node has a capacity to store each block of the at least one block of data of the associated set.

15. The system of claim 14, wherein the scheduler is further adapted to remove the reservation for the at least one data block after the at least one selected worker node performs the associated task.

16. The system of claim 13, wherein a plurality of candidate tasks of the plurality of tasks may be performed by a given worker node of the plurality of worker nodes, the scheduler being adapted to select the candidate task from the plurality of candidate tasks which has the most associated data stored locally on the given worker node.

17. The system of claim 13, wherein the scheduler is adapted to reorder the order defined by the array-based programming language to minimize a data transfer.

\* \* \* \* \*